United States Patent
Stein

(10) Patent No.: US 10,527,742 B2
(45) Date of Patent: Jan. 7, 2020

(54) GAIN STABILIZATION OF DETECTOR SYSTEMS UTILIZING PHOTOMULTIPLIERS WITH SINGLE PHOTO ELECTRONS

(71) Applicant: TARGET SYSTEMELEKTRONIK GMBH & CO. KG, Wuppertal (DE)

(72) Inventor: Jürgen Stein, Wuppertal (DE)

(73) Assignee: TARGET SYSTEMELEKTRONIK GMBH & CO. KG, Wuppertal (DE)

( * ) Notice: Subject to any disclaimer, the term of this patent is extended or adjusted under 35 U.S.C. 154(b) by 0 days.

(21) Appl. No.: 15/348,327

(22) Filed: Nov. 10, 2016

(65) Prior Publication Data

US 2017/0108597 A1  Apr. 20, 2017

Related U.S. Application Data

(63) Continuation of application No. PCT/EP2015/060384, filed on May 11, 2015.

(30) Foreign Application Priority Data

May 11, 2014  (EP) .................................... 14167815

(51) Int. Cl.
*G01T 1/40* (2006.01)
*G01T 1/20* (2006.01)
(Continued)

(52) U.S. Cl.
CPC ................ *G01T 1/40* (2013.01); *G01T 1/202* (2013.01); *G01T 1/2006* (2013.01); *G01T 1/208* (2013.01)

(58) Field of Classification Search
CPC ......... G01T 1/40; G01T 1/2006; G01T 1/202; G01T 1/208
(Continued)

(56) References Cited

U.S. PATENT DOCUMENTS 2,982,860 A * 5/1961 Luntz ...................... H01J 43/30
250/207
3,089,955 A * 5/1963 Scherbatskoy ........... G01T 1/40
250/363.01
(Continued)

FOREIGN PATENT DOCUMENTS

DE  28 26 484 A1  12/1979
GB  2 023 814 A   1/1980

OTHER PUBLICATIONS

International Search Report for corresponding International Application No. PCT/EP2015/060384 dated Aug. 26, 2015.

*Primary Examiner* — David P Porta
*Assistant Examiner* — Blake C Riddick
(74) *Attorney, Agent, or Firm* — Myers Wolin, LLC

(57) ABSTRACT

A self-stabilizing scintillation detector system for the measurement of nuclear radiation, preferably gamma radiation, is provided, the system comprising a scintillation crystal, a photo detector, a photomultiplier (PMT) and one or two fast digital sampling analog to digital converters (ADC), where the scintillator is selected from a group of materials having a light decay time of at least 1 ns, and where the PMT is set to its highest possible gain. A first ADC for processing the single photo electron induced signals is connected to the PMT output, namely the anode output, this first ADC being set to operate with a very high sampling rate of at least 10 MHz, and a second ADC for processing the nuclear particle induced signals is connected to one of the PMT's dynodes with a significantly lower amplification.

5 Claims, 4 Drawing Sheets

(51) Int. Cl.
*G01T 1/202* (2006.01)
*G01T 1/208* (2006.01)

(58) Field of Classification Search
USPC .... 250/371, 252.1, 362, 361 R, 369, 370.11, 250/207, 366
See application file for complete search history.

(56) References Cited

U.S. PATENT DOCUMENTS

| | | | | |
|---|---|---|---|---|
| 3,171,032 A * | 2/1965 | Holt | ................ | H01J 43/30 250/205 |
| 3,184,597 A * | 5/1965 | Scherbatskoy | ........... | G01T 1/40 250/207 |
| 3,428,804 A * | 2/1969 | Comunnetti | .............. | G01T 1/40 250/252.1 |
| 3,515,878 A * | 6/1970 | Ried, Jr. | ................... | G01T 1/40 250/207 |
| 3,922,541 A * | 11/1975 | Seeman | ................... | G01T 1/40 250/252.1 |
| 4,272,677 A * | 6/1981 | Berthold | ................ | G01T 1/40 250/252.1 |
| 4,618,775 A * | 10/1986 | Persyk | ................... | G01T 1/208 250/369 |
| 4,717,825 A * | 1/1988 | Smith, Jr. | ................. | G01T 1/40 250/256 |
| 4,883,956 A * | 11/1989 | Melcher | ................ | G01T 1/2002 250/269.2 |
| 4,918,314 A * | 4/1990 | Sonne | ................... | G01T 1/208 250/262 |
| 5,198,670 A * | 3/1993 | VanCauter | .............. | G01T 1/204 250/328 |
| 5,360,975 A * | 11/1994 | Stoller | ................... | G01V 5/04 250/261 |
| 5,548,111 A * | 8/1996 | Nurmi | ................... | H01J 43/30 250/207 |
| 5,600,135 A * | 2/1997 | Jacobson | ................ | G01T 1/40 250/261 |
| 5,866,907 A * | 2/1999 | Drukier | ................ | G01N 33/60 250/328 |
| 6,021,341 A * | 2/2000 | Scibilia | ................... | G01T 1/161 600/407 |
| 6,087,656 A * | 7/2000 | Kimmich | ................ | G01T 1/40 250/252.1 |
| 7,005,646 B1 * | 2/2006 | Jordanov | ................ | G01T 1/208 250/207 |
| 7,157,681 B1 * | 1/2007 | Tetzlaff | ................... | H01J 43/04 250/205 |
| 7,253,761 B1 * | 8/2007 | Hoyos | ................... | H03M 1/121 341/143 |
| 7,480,362 B2 * | 1/2009 | Carmi | .................... | A61B 6/032 378/19 |
| 2004/0016867 A1 * | 1/2004 | Milshtein | ................ | H01J 43/30 250/207 |
| 2005/0258371 A1 | 11/2005 | Stein et al. | | |
| 2006/0289775 A1 * | 12/2006 | Inbar | ....................... | G01T 1/167 250/370.11 |
| 2009/0146073 A1 * | 6/2009 | Stein | ........................ | G01T 1/20 250/370.11 |
| 2009/0230285 A1 * | 9/2009 | Wright | .................... | H01J 43/30 250/207 |
| 2010/0020922 A1 * | 1/2010 | Carmi | .................... | G01T 1/1644 378/19 |
| 2010/0065746 A1 * | 3/2010 | Grazioso | ............... | G01T 1/1644 250/363.04 |
| 2010/0090114 A1 * | 4/2010 | Bauer | .................... | G01T 1/1644 250/363.04 |
| 2011/0031405 A1 * | 2/2011 | Kulik | ....................... | G01T 1/40 250/362 |
| 2011/0091207 A1 * | 4/2011 | Xie | ....................... | H04B 10/564 398/38 |
| 2011/0101230 A1 * | 5/2011 | Inbar | ....................... | G01T 1/167 250/370.05 |
| 2011/0211675 A1 * | 9/2011 | Ramsden | .................. | G01T 1/40 378/82 |
| 2012/0175514 A1 * | 7/2012 | Izumi | ...................... | H01J 43/30 250/281 |
| 2012/0305783 A1 * | 12/2012 | Gagnon | ................ | G01T 1/1647 250/366 |
| 2014/0077073 A1 * | 3/2014 | Vu | ............................ | G01T 1/40 250/252.1 |
| 2014/0084149 A1 * | 3/2014 | Stoller | ...................... | G01T 1/20 250/261 |
| 2015/0212218 A1 * | 7/2015 | Manslow | .................. | G01T 1/40 378/207 |
| 2016/0003671 A1 * | 1/2016 | Fontbonne | ............. | G01T 1/248 250/208.2 |

* cited by examiner

GAIN STABILIZATION OF DETECTOR SYSTEMS UTILIZING PHOTOMULTIPLIERS WITH SINGLE PHOTO ELECTRONS

CROSS REFERENCE TO RELATED APPLICATIONS

This application is a continuation of International Application No. PCT/EP2015/060384, filed on May 11, 2015, which claims priority to European Application No. 14167815.1, filed May 11, 2014, the contents of each of which are incorporated by reference herein.

TECHNICAL FIELD

The invention relates to a self-stabilizing scintillation detector system for the measurement of nuclear radiation, preferably gamma radiation, comprising a scintillation crystal, a photo detector, a photomultiplier tube (PMT) within dynodes and an evaluation system connected to the output port of the PMT, i.e. the anode of the PMT.

BACKGROUND

Such systems are principally known in the art. It is especially known that the gain µ of a scintillation detector system, comprising a scintillator, a photocathode and a photomultiplier tube (PMT) together with an evaluation system is subject to a change in gain over time. The gain change of the overall system is substantially effected by the gain change of the PMT. That gain change is due to environmental changes, i.e. a modification in temperature over time or other environmental factors.

In order to stabilize the gain of the PMT, it is known in the art to conduct several measurements over time and to compare the results. An initial or reference measurement may take place at beginning of the first measurement of nuclear radiation, for example using a calibration source with well-known energies of the emitted gamma radiation. The light signals, produced by the gamma radiation in the scintillator crystal, are proportional to the energy deposed in that crystal. The light signals do then hit the photocathode, that photocathode emitting electrons, which are collected by a PMT. A PMT consists of a series of dynodes and a final anode. The—usually very few—photoelectrons from the photocathode are accelerated towards the first dynode where they produce a multitude of electrons, being emitted from that first dynode. Those electrons are then accelerated to the next dynode, where their number is again multiplied by the same factor, those electrons being led to the next dynode and so on, until they finally reach the anode of the PMT, where a current signal is measured, being proportional to the charge of the multitude of electrons. That charge is proportional to the amount of light, generated in the scintillator and therefore proportional to the energy deposed by the gamma radiation in the scintillator.

The resulting charge signal is then further processed and usually stored in a multichannel analyzer (MCA), each channel of that MCA corresponding to a specific radiation energy, deposed in the scintillator crystal. An accumulation of such energy signals results in an energy spectrum, each line in that spectrum corresponding to a specific energy deposed in the detector system.

For most applications it is of interest to obtain the best resolution in energy a system allows. One of the problems, leading to a decrease in energy resolution is the gain shift, which is to be avoided therefore.

In order to do so, it is known to measure the gain at different times, using gamma radiation with known energy. This gamma radiation with known energy may be emitted by a calibration source, or may be another known energy, being present in the spectrum to be measured anyway. The gain of the two measurements at different times is compared and the signals are corrected by the difference, therefore multiplying all signals by a so-called gain correction factor, thereby stabilizing the overall system.

DE 2 826 484 does propose to use a quantum reference by utilizing the single photo electron charge. Single photo electrons are emitted as thermionic current from the cathode of a photomultiplier tube. Those single electron induced pulses are detectable at a pulse height several orders of magnitude of below the equivalent lowest scintillation pulse range for gamma energies. DE 2 826 484 proposes to split the PMT output signal into two channels, one channel with an amplification suitable for the normal gamma energies to be measured, the other channel with a higher amplification in order to make the SEP's visible also. The two channels are distinguished by applying different pulse width discrimination, thereby separating pulses with a broad timing constant of 230 ns and those with a shorter timing constant of about 30 ns, the latter being those of the single electron induced peaks, which is seen by DE 2 826 484 at a 800 eV gamma equivalent. Stabilization was performed by comparing count rates in low energy ROIs without determining the peak distribution and without extracting stabilization parameters.

A specific disadvantage of such a method is that the PMT has to be set to an amplification being high enough to identify the single electron signals. As this does also amplify the gamma induced pulses much more than necessary, such a detector system can be used only for radiation sources with a low count rate. It is also not possible to measure high energy gamma radiation with such a system.

It is also known to use artificial light pulses instead of light pulses, generated by the scintillation crystal following the absorption of radiation energy. Such an artificial light source may be an LED.

All the methods known in the prior art require troubling extra references in the form of complex light sources, thermometers and/or undesired radioactive sources. They also suffer from the fact that they do not cover the complete dynamic count rate regime of a spectrometer. One has to know either a specific—constant—line (energy) in the spectrum to be measured or to use a calibration source, thereby interrupting the measurement from time to time. In addition, especially at high count rates and/or high gamma radiation energy, it may be difficult to obtain a stabilized spectrum at all.

The aim of the present invention is therefore to avoid the above-mentioned disadvantages and to provide a self-stabilizing scintillation detector system without the need of identifying specific lines in the output spectrum, identified as calibration sources, and to correct the gain on the basis of the shift of those lines.

SUMMARY

Disclosed is a self-stabilizing scintillation detector system for the measurement of nuclear radiation, preferably gamma radiation, comprising a scintillation crystal, a photo detector, a photomultiplier (PMT) and one or two fast digital sampling analog to digital converters (ADC). The scintillator is selected from a group of materials, having a light decay time of at least 1 ns. The PMT is set to a very high, preferably its highest possible gain. A first ADC for processing the single photo electron induced signals is connected to the PMT output, namely the anode output, this first ADC being set to operate with a very high sampling rate of at least 10 MHz, whereas a second ADC for processing the nuclear particle induced signals is connected to one of the PMT's dynodes with a significantly lower amplification. Preferably, the sampling rate of the second ADC is significantly lower than the sampling rate of the first ADC, preferably two orders of magnitude lower, for example using a sampling rate for the second ADC of at least 100 kHz. The first ADC is preferably being set to operate with a sampling rate of at least 100 MHz, even more preferably at about 1 GHz.

It is most advantageous when the two ADC's are connected to the anode and dynode output without analog electronics, especially without a preamplifier, in between the signal output and the respective ADC. It is even better if the detector system does utilize two data acquisition systems (DAQ), the first DAQ connected to the dynode output for acquisition and evaluation of the gamma induced pulses, the second DAQ connected to the PMT output for acquisition and evaluation of single electron induced pulses (SEP), relating to single photo electrons being emitted as thermionic current from the photocathode.

Also disclosed is a method for stabilizing a scintillation detector system for the measurement of nuclear radiation, preferably gamma radiation, as described within this application, said method comprising the following steps: evaluating the output signals of the first ADC by their voltage as a function of the signal timing, identifying the single photo electron induced signals by evaluating only those signals with a timing information around 5 ns, identifying the charge of the resulting signal peaks in the associated data spectrum, determining the gain shift by comparing said signal peak with a previous reference peak, adjusting the gain of the PMT on the basis of said gain shift, and evaluating the output signals of the second ADC by determining the number of events as a function of the measured charge, said charge being a function of the energy, the nuclear particle has deposited in the scintillator.

BRIEF DESCRIPTION OF THE DRAWINGS

A specific example will be described in the following, referring to a figure, describing the principle set of the claimed system.

FIG. 4(*b*) shows a 60 keV event recorded on a fast oscilloscope;

DETAILED DESCRIPTION

Figure 1:
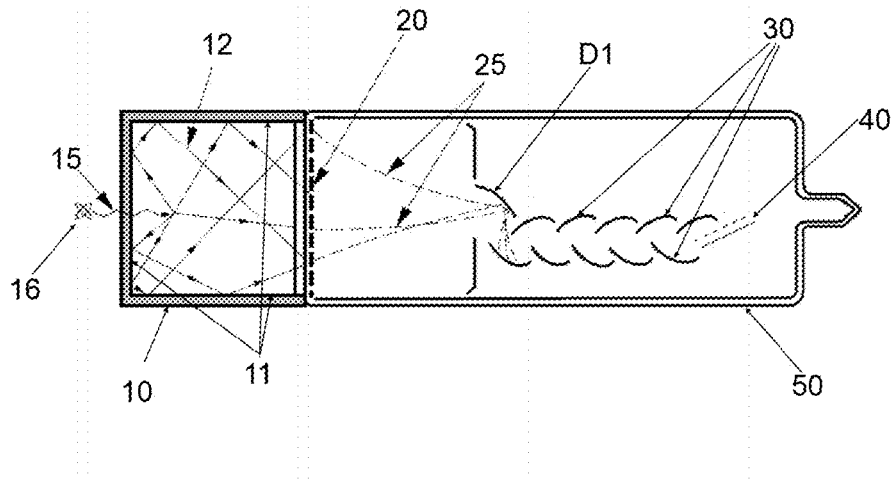
FIG. 1 shows a known scintillator crystal with a reflective coating.

FIG. 1 shows a scintillator crystal 10 with a reflective coating 11, reflecting the light 12, emitted from the scintillator when a gamma ray 15 from a radiation source 16 interacts with the scintillation crystal. At one side of the scintillator crystal, a photocathode 20 is located. There is no reflective coating in a scintillator crystal at the side of the photocathode.

When the light 12 hits the photocathode 20, photoelectrons 25 are emitted and directed to a dynode chain 30 within a photomultiplier tube (PMT) 50, hitting the first dynode D1. The number of electrons hitting the first dynode D1 is then multiplied by a factor g from the first dynode, then hitting the second third and so on dynodes before leading to the anode 40. From the anode 40, the current signal is directed to a preamplifier, a voltage amplifier and a discriminator, then further processed by an analog to digital converter (ADC) whereas the resulting digital signal is stored in a memory, i.e. a memory of a multichannel analyzer. That spectrum may be further evaluated with a computer.

Figure 5:
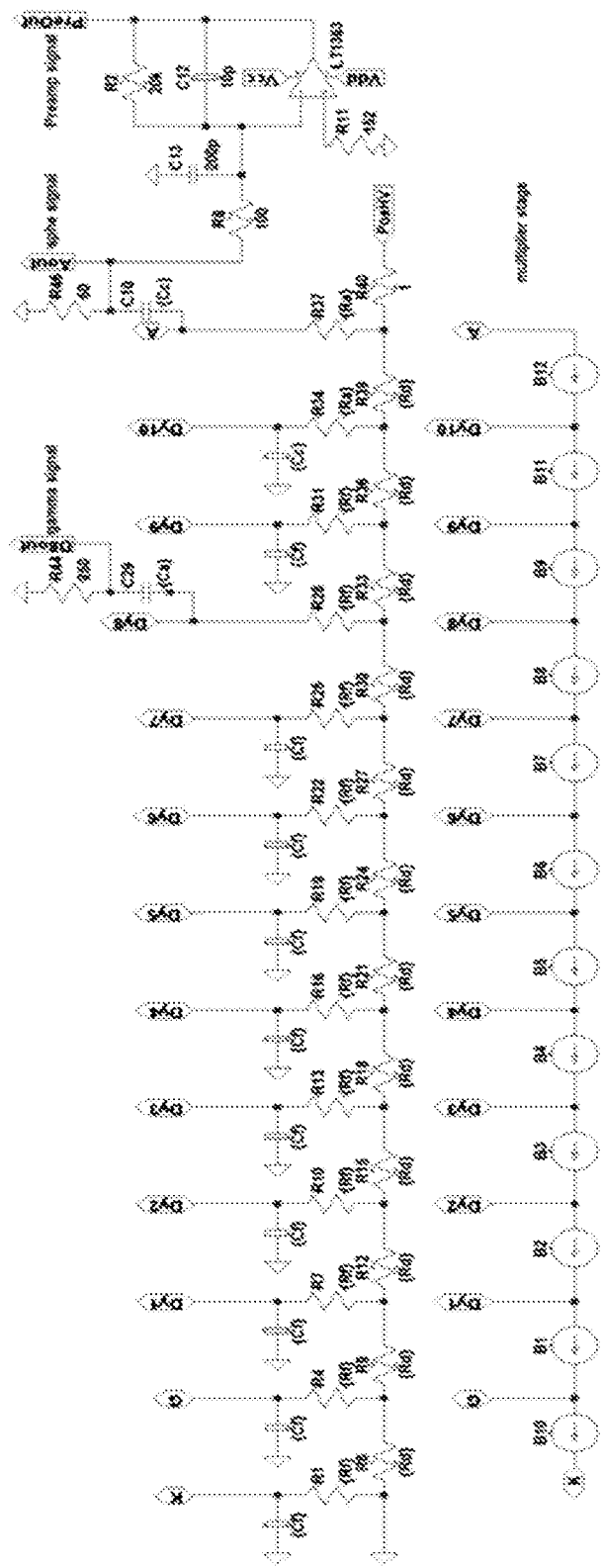
FIG. 5 shows a circuit having a multiple dynode and anode readout.

As shown in FIG. 5, dynode number 8 is connected to a separate data acquisition system (DAQ). As it is known from the prior art already, it is possible to make use of the signal arriving at dynodes in the dynode chain also. It has to be noted that the anode, i.e. the usual output of the PMT, does measure the current, i.e. the number of electrons, arriving at the anode. From a physical point of view, the current measured at the dynodes does refer to the "missing current", produced by the additional electrons, leaving the dynode, due to the amplification of the signal.

Apart from that the signal, which can be measured at the dynodes, is, like the signal at the anode, proportional to the energy deposed in the scintillator, which is proportional to the amount of light produced in the scintillator by a radiation event, that amount of light being proportional to the number of electrons emitted by the photocathode when the light is hitting that photocathode.

Single photo electrons (SPE) are emitted as thermionic current from the cathode of a photomultiplier tube. Even if no external light source is present, those photo electrons account for the majority of dark current pulses of a PMT. In a scintillation detector at room temperature, one can expect a few hundred SPE counts per second from thermionic noise as well as from low energy scintillation pulses of background gamma and beta radiation. In order to detect and histogram tiny SPE pulses, measurements need to be carried out at the highest possible PMT gains. Such high amplification factors restrict the useable dynamic range and render simultaneous gamma measurements impossible as the gamma signals at high gains overload the output circuits.

Due to the quantum mechanical nature of the photo effect, charge packets in PMTs come in digital increments of one electron charge.

If gamma scintillation had to be measured at the same amplification level as used for SPE's, gamma pulses would be vastly higher. A 3 MeV gamma quantum converted by a NaI(Tl) scintillator would reside at a position $3 \times 10^4$ times above the SPE peak location. The histogram then would require a length of 1,000,000 bins in order to match the scale for simultaneous accurate SPE measurements.

According to the present invention, the SPE signal shall be used as a pulse height reference. This can be done with a high amplification setup of the PMT. But gain stabilization must operate simultaneous with the data acquisition of the much higher gamma radiation signals. It is therefore necessary to overcome the energy range limitation of standard gamma measurements. To do so, it is proposed to use sampling analog to digital converter (ADC) fast enough to digitize PMT anode current directly. The charge of a SPE can be digitized as accurate from the current signal as with known charge integrating analog electronics, however at much smaller integration times. It turned out that fast PMT current sampling techniques reduce the dynamic range requirements significantly compared to front end charge integration techniques.

It is one aim of this invention to measure the SPE signal separately in its own highly amplified signal path so that it could as well run in parallel to a gamma data acquisition. This would require two DAQs (data acquisition systems) operating in parallel, one for the SPE and another for the gamma pulses. The necessary amplification of the SPE signal is attained at the anode stage of a PMT running at its highest gain. The gamma energy can be picked up at a lower stage dynode at an amplification level matching the necessary gamma energy range dynamic.

The combination of fast current sampling and using separate amplification stages for gammas and SPEs enhances the system performance significantly over a single channel assembly. The dual readout construction extends the gamma energy range and count rate capacity even further and covers scintillation decay times of very fast scintillation materials (like plastics) used for gamma counting.

Typical gamma radiation measurements for pulse height analysis (PHA) operate within an energy range of 30 keV to 3 MeV. A modern scintillator based gamma detector consisting of a scintillation crystal attached to regular photomultiplier tube will deliver typically 10 phe/keV at the PMT cathode.

The average SPE charge then amounts to approximately 100 $eV_{equ}$. The inventor found that this differs from the expected 800 $eV_{equ}$ peak described in DE 2 826 484. It is more than two orders of magnitude smaller than the 30.000 eV lower limit of the gamma energy range. Therefore, measuring a single photo electron charge with sufficient accuracy for calibration and stabilization demands a system with much higher measurement accuracy than available and offered today. A rough calculation with the typical spectral resolutions for SPE measurements demonstrates the challenge: An extraordinary energy resolution of 3 eV in a range of 3 MeV would be necessary for a charge sensitive, integrating preamplifier with ADC configuration. A dynamic range of 1:1.000.000 (20 bits) is still beyond the available range of suitable commercial of the shelf high end amplifiers and fast sampling ADCs.

However, when the front end charge integrating stage, typically performed by an analog preamplifier, is omitted and the PMT output is digitized directly at high speed, the dynamic range requirement is reduced significantly.

The result of fast current digitization is a pulse height enhancement for the SPE signal by two orders of magnitude in an NaI(Tl) based DAQ. An NaI(Tl) scintillator has a typical scintillation light decay time of 250 ns. At high sampling speeds the PMT output current trajectory is recorded with good precision and the necessary charge integration can be calculated numerically with digital signal processing from the sampled current values.

Since an SPE pulse height distribution has a relative full width half maximum (FWHM) of only 50 percent or worse, it is sufficient to use only four bits for its digitization without degrading the measured resolution. Additional ten bits will cover the full gamma range. 14 bit ADCs at several hundred MHz sampling rate are state of the art. They allow the construction of the proposed system acquiring SPE's and gammas when still sampling only one PMT output.

Figure 2:
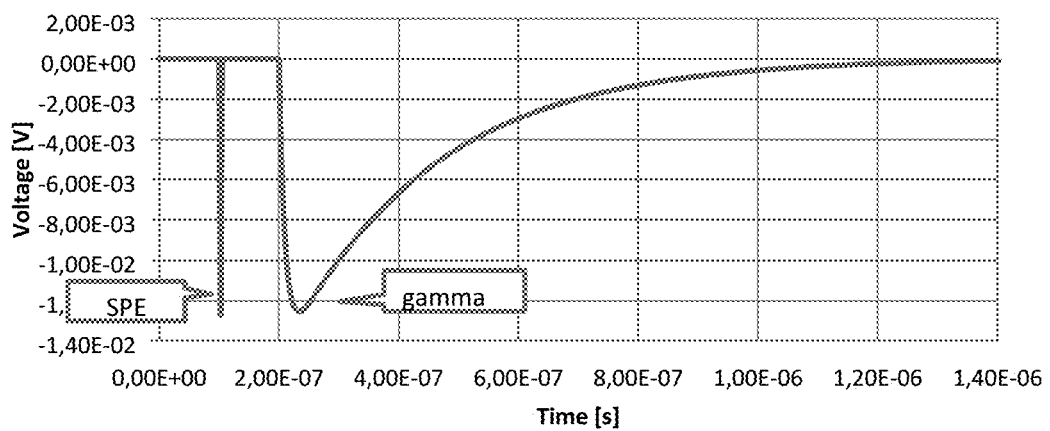
FIG. 2 shows a simulated NaI(Tl)-detector signal.
Figure 3:
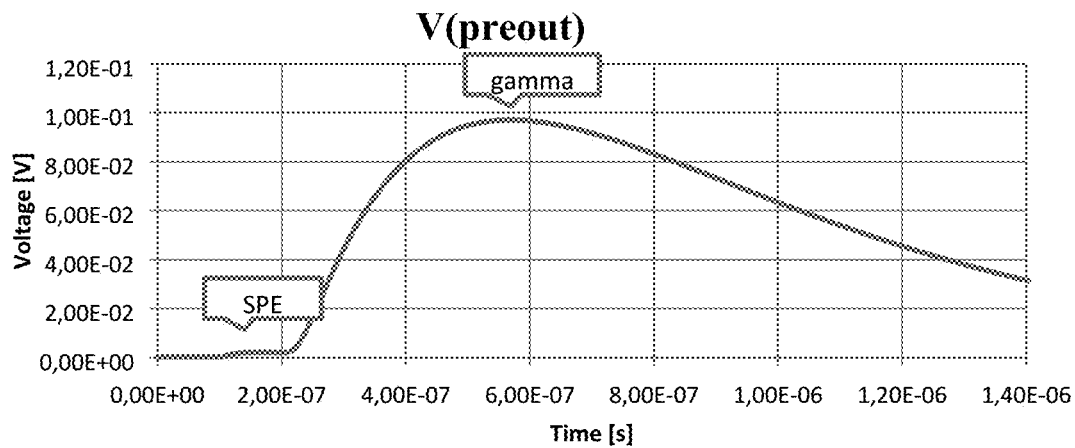
FIG. 3 shows a NaI(Tl)-detector signal processed differently from that of FIG. 2.

The difference and especially the improvement achieved by the present invention is shown in FIGS. 2 and 3. In the signal simulation depicted in FIG. 2, a 5 ns short SPE signal appears as current spike on the time axis followed by a 250 ns gamma pulse. The current curve of the gamma scintillation light pulse reflects the exponential scintillation light decay. With digital signal processing, the corresponding charges can be calculated by numerically integrating the current signal. SPE pulses would be processed at significantly shorter integration times than gamma pulses. As shown in the simulation diagrams, fast current measurements yield both, SPE and small gamma energy signals within the same pulse height region—whereas the charge measurement in FIG. 3 shows the height discrepancy between even a very low energy gamma of 10 keV and the SPE charge at 0.1 $keV_{equ}$.

More specifically FIG. 2 shows a simulated NaI(Tl)-detector signal. The anode output is decoupled by a capacitor and measured at a resistive load. The signal is proportional to the anode current. A SPE pulse is followed by a 10 keV gamma. The distinct spike of the SPE current is clearly visible. The simulation presented in FIG. 3 shows a NaI(Tl)-detector signal again. Preamp output providing a signal proportional to the charge of individual pulses. A SPE pulse is followed by a 10 keV gamma. The SPE charge step is significantly smaller than a 10 keV gamma and is merely noticeable.

Figures 4A, 4B:
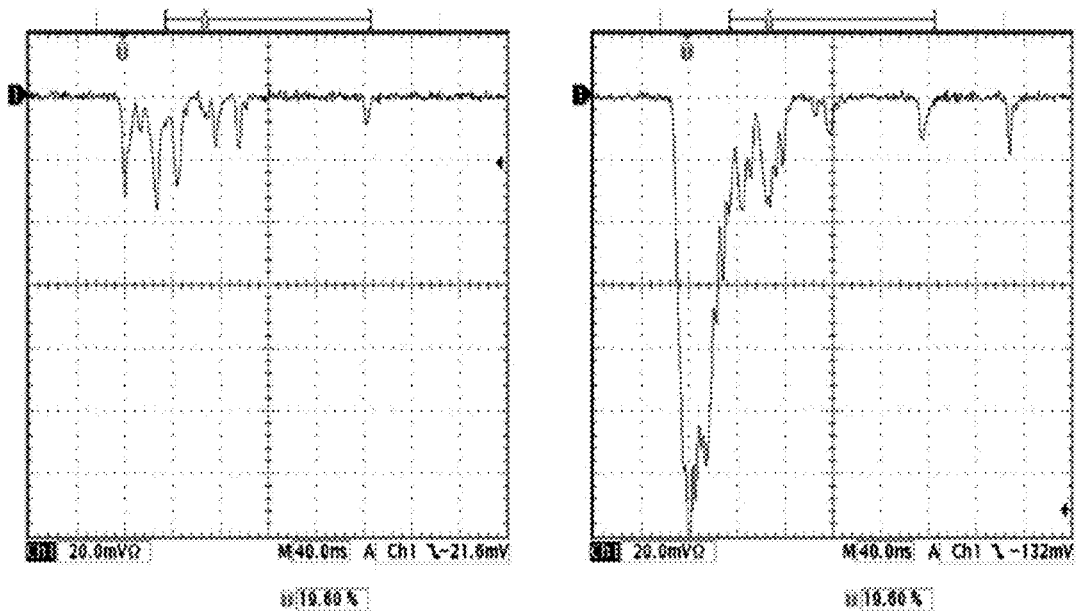
FIG. 4(*a*) shows a low energy X-ray capture of 55 Fe with an energy of 5.9 keV in a YAP(Ce) crystal recorded on a fast oscilloscope.

This can also be seen when a fast sampling oscilloscope is connected to the anode output of a real detector system as shown in FIGS. 4(*a*) and 4(*b*). Several overlaying electron charges form the decaying scintillation pulse and single electron pulses become visible. Oscilloscope pictures of measured PMT current signals of low energy x-ray scintillation pulses also demonstrate the abundance of SPE's during a measurement. The scintillation current signal is not as smooth as in the idealized simulation discussed before; however, the SPE and gamma signal height proportions are reproduced in the simulation.

More specifically, FIG. 4(*a*) shows low energy X-ray capture of 55 Fe with an energy of 5.9 keV in a YAP(Ce) crystal recorded on a fast oscilloscope. Individual photoelectrons are clearly seen. As seen in FIG. 4(*b*), a 60 keV event gives a semblance of a single output pulse but individual photoelectron structure is evident, especially in the tail.

For slow to medium decay time scintillators, fast current measurements are sufficient to measure SPE events together with gamma scintillation pulses in one single processing channel. For fast scintillators the dynamic range requirement may still be too high to measure SPE distribution together with gamma spectra in a single channel. As a solution, the SPE signal is collected at a different analog output with higher amplification.

A PMT assembly already provides several independent amplification stages. Principally, dynodes can also serve as current output. Except for the last dynode, dynode outputs at lower stages are scarcely used. A combined read-out and pulse height analysis at a low stage dynode and the anode simultaneously, as proposed here, is not known from the prior art.

With a PMT set up for high gain, the SPE signal can be taken at the anode, whereas the gamma energy would be collected with significantly lower amplification at one of the prior dynodes without exceeding the required dynamic range.

For the stabilization process the SPE peak centroid will be calculated in a fitting routine and the gain will be corrected accordingly so that the SPE peak remains at the same position. The statistics in the SPE peak will need to have enough counts to provide for a low statistical error in the centroid. A rough calculation yields a 1σ error for the centroid of 0.3% for 10.000 counts.

The PMT layout offers several output stages at different amplification levels. The range is broad enough to cover a dynamic of 107 from 10 eV up to 100 MeV. The proposed multiple dynode and anode readout, as well as the associated analog to digital converters ADC1 and ADC2, is depicted in the circuit in FIG. 5.

The SPE signal is taken at the anode {Aout}, gamma energy is measured at dynode 8 {D8out}. The {Preout} charge integrating output has been added for demonstration purpose only and the preamp circuit is no longer required.

Figure 6:
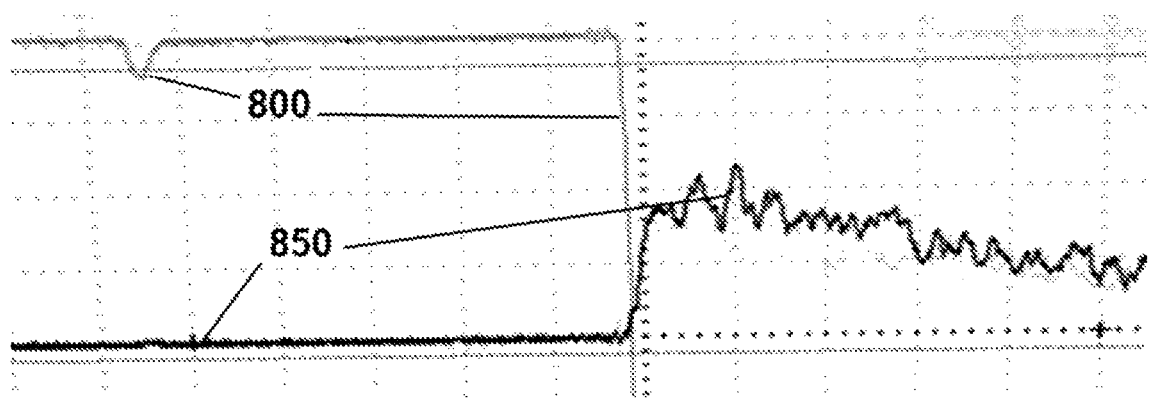
FIG. 6 shows the correspondence between dynode 8 (gamma) and anode (SPE) output.

The picture in FIG. 6 shows the correspondence between dynode 8 (gamma) and anode (SPE) output. The SPE peak is well recognizable on the anode trace 800. However it is too small to be recognized or triggered in the gamma channel with the yellow trace 850.

What is claimed is:

1. A self-stabilizing scintillation detector system for the measurement of gamma radiation, comprising:
    a scintillation crystal,
    a photo detector,
    a photomultiplier tube (PMT), and
    two digital sampling analog to digital converters (ADC) with sampling rates of at least 100 KHz,
    characterized in that the scintillation crystal is selected from a group of materials, having a light decay time of at least 1 ns, and that the PMT is set to an amplification,
    whereas a first ADC of the two ADC (ADC1) for processing a single photo electron induced signals (SPE) is connected to the anode output, this first ADC being set to operate with a sampling rate of at least 10 MHz,
    whereas a second ADC of the two ADC (ADC2) is connected to one of the PMT's dynodes with a lower amplification than the first ADC,
    the detector system further comprising two data acquisition systems (DAQ), the first DAQ connected to the dynode output for acquisition and evaluation of the gamma induced pulses, the second DAQ connected to the PMT output for acquisition and evaluation of single electron induced pulses (SEP), relating to single photo electrons being emitted as thermionic current from the photocathode.

2. The detector system of claim 1, wherein the sampling rate of the second ADC (ADC2) is lower than the sampling rate of the first ADC (ADC1) and is at least 100 kHz.

3. The detector system of claim 1, wherein the first ADC (ADC1) is being set to operate with a sampling rate of at least 100 MHz.

4. The detector system of claim 1, wherein the two ADC's are connected to the anode and dynode output without analog electronics or a preamplifier in between, the signal output and the respective ADC.

5. A method for stabilizing a scintillation detector system for the measurement of gamma radiation, according to claim 1 the method comprising:
    evaluating the output signals of the first ADC (ADC1) by their voltage as a function of the signal timing, thereby determining the charge the output signal has deposed at the anode of the PMT,
    identifying the single photo electron induced signals (SPE) by evaluating only those signals with a timing information on the order of 5 ns,
    storing the resulting signals in a memory as a spectrum in a data acquisition system (DAQ), where a multitude of signals form a signal peak in said spectrum,
    identifying the charge of the resulting signal peaks in the stored spectrum and calculating their peak centroid,
    conducting a reference measurement and storing the position of the resulting signal peak as a reference peak,
    determining the change in amplification, the gain shift, by comparing the position of said signal peak centroid with the reference peak centroid in the stored spectrum,
    adjusting the amplification of the PMT on the basis of said gain shift,
    evaluating the output signals of the second ADC (ADC2) by determining the charge the output signal has deposed at the dynode of the PMT, said charge being a function of the energy, the gamma quantum has deposited in the scintillation crystal and storing the resulting signals in a memory as a spectrum in a data acquisition system (DAQ), where a multitude of signals form a signal peak in said spectrum.

* * * * *